UNITED STATES PATENT OFFICE.

GEORGE W. HOLLEY, OF ITHACA, NEW YORK.

MANUFACTURE OF PAINT.

SPECIFICATION forming part of Letters Patent No. 349,885, dated September 28, 1886.

Application filed November 19, 1885. Serial No. 183,311. (Specimens.)

*To all whom it may concern:*

Be it known that I, GEORGE W. HOLLEY, a citizen of the United States of America, residing at Ithaca, in the county of Tompkins and State of New York, have invented a new and useful Process of Making Paints to be used in covering wood, brick, stone, metals, and any other surfaces that need preservation and protection from the action of all the elements except fire; and I do hereby declare that the following is a full, clear, and exact description of the invention, which will enable others skilled in the art to which it appertains to make and use the same.

The object of my invention is to make paints with a stronger body, more durable, and less liable to corrosion and disintegration than any other paint heretofore made.

To carry my invention into effect, take any quantity, by weight, of any given pigment, as white or red lead, oxide of zinc, or zinc-white, or any of the ochres, or any mixtures of any or all of these, and add thereto from one-tenth to one-half, or even more, by weight, of thoroughly pulverized brimstone or flower of sulphur, and mix them thoroughly together. Then put into a proper boiler or kettle a quantity of linseed-oil, boiled or raw, equal to one-third of the weight of the mixture, and raise the temperature of the oil to 80° centigrade. Then while thoroughly stirring the oil sift or shake in the mixture and raise the whole gradually to a temperature of one hundred and twenty (120) to one hundred and twenty-five (125) degrees centigrade. Then take the kettle from the fire or turn off the heat and let the mass slowly cool down, thoroughly stirring or agitating it in the meantime. After cooling there will be found more or less small aggregations of the sulphur and pigments, and the whole must be thoroughly ground, after which it may be made of the proper consistence for application with the ordinary paint-brushes in use.

The result of the process is that by the heating or boiling of the materials used the sulphur is melted and a portion of it is absorbed by the oil, and a small portion also combined with the pigments used, and the whole mass is brought by grinding into a thorough mechanical mixture, to which may be given any desired consistence.

Different tints or shades of color are to be obtained either by introducing colored pigments before grinding, or by mixing different-colored paints after they are ground.

Sulphurized oil should be used in preparing different-colored pigments or in thinning down the paints, or where they have become condensed by long standing.

Sulphurized oil is to be obtained by putting ten per cent. of its weight of flower of sulphur into raw or boiled linseed oil, and heating it to 125° centigrade, and allowing it to cool and settle. A great advantage of this process is that the sulphur acts as a drier, and a very good and unusually durable paint may be obtained by mixing any kind of pigment with the sulphurized oil.

What I distinctly claim as my invention is—

1. The process for making improved paints or pigments herein described, which consists in first thoroughly mixing with the given quantity of mineral oxide, earth, or other pigmentary material from one-tenth to one-half its weight of flower of sulphur, then gradually adding to the mixture about one-third of its weight of linseed-oil, previously heated to a temperature of 80° centigrade, constantly stirring the same meanwhile, and at the same time gradually raising the temperature to about 120° or 125° centigrade; thirdly, allowing the whole slowly to cool down while being constantly stirred, and lastly grinding the mass as paint is ground, and thinning the same when necessary to the desired consistency for use as a paint, substantially as set forth.

2. The improved product, composition, or paint herein described, consisting of a given quantity of mineral oxides, earths, or other pigments, combined with from one-tenth to one-half its weight of finely-pulverized sulphur and linseed-oil, in the proportions and in the manner specified, all substantially as set forth.

Ithaca, November 17, 1885.

GEORGE W. HOLLEY.

Witnesses:
IRVING P. CHURCH,
FRANK M. LEARY.